Patented Nov. 24, 1936

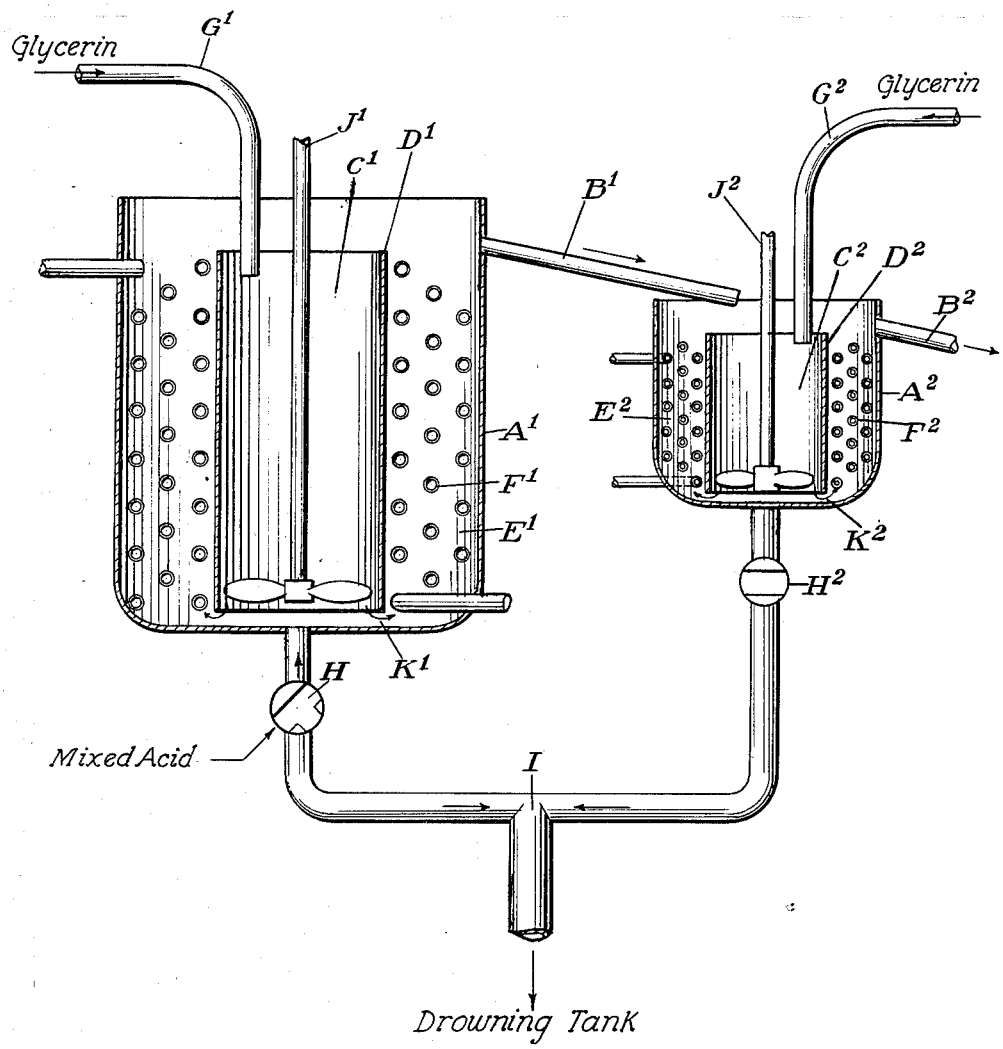

2,061,728

UNITED STATES PATENT OFFICE 2,061,728

NITRATION OF GLYCERIN

Frederick Alexander Ferrier Crawford, West Kilbride, and William Arthur Percival Challenor, Ardrossan, England, assignors to Imperial Chemical Industries Limited, a corporation of Great Britain Application January 16, 1935, Serial No. 2,014
In Great Britain January 20, 1934

11 Claims. (Cl. 260—144)

The present invention relates to a new and improved process for manufacturing liquid nitric esters, and more particularly to a continuous process for nitroglycerin.

In the manufacture of nitric esters, such as nitroglycerin and the like, it is recognized by those skilled in the art that the spent nitration acids possess an appreciable "dissolving power" for the nitric esters. The term "dissolving power", as used, refers to a combination of two separate effects: (1) simple physical solution without decomposition, and (2) decomposition due to hydrolysis, oxidation, and the like.

The dissolving power of the spent acid varies considerably with the composition of the acid. In general, it may be said, however, that having acids with relatively low water content and having a nitric acid content not too low the action is mainly simple solution. With acids of relatively high water content and consequently low total acidity and additional denitrating effect comes in. The spent acid of minimum dissolving power may be stated in general to have a total acid in the neighborhood of 88%.

Although the technique employed in the manufacture of nitric esters, either by the batch or by the continuous process, has been greatly improved within recent years, nevertheless the "dissolving power" of the spent acid has not heretofore been reduced to a minimum. In both the batch and the continuous processes, the nitric esters formed in the reaction remained in contact with the spent or partially spent acid for a considerable period of time. Indeed, in the commonly employed continuous processes, this condition prevailed during substantially the entire time the ester was present in the reaction vessel. Consequently, the spent acid contained the maximum or equilibrium amounts of "dissolved" nitric ester. From these facts it will be appreciated that the practice heretofore employed has not been sufficient to obtain the maximum yields of nitric ester, since the time of contact between the ester and a spent acid of appreciable "dissolving power" has not been reduced to a minimum.

The object of the present invention is a new and improved process of manufacturing liquid nitric esters. A further object is a process for the production of liquid nitric esters, in which yield losses due to the "dissolving power" of the spent acid are reduced to a minimum. A still further object is an improved continuous process for the production of nitroglycerin. Other objects will be apparent as the invention is hereinafter described.

We have found that these objects may be accomplished by a new method of nitration which employs a number of nitration vessels connected in series. According to our invention, the material to be nitrated is introduced continuously into each of the series of nitrating vessels, whereas the entire amount of nitrating acid to be employed is introduced continuously in the first vessel only. The products of the reaction in the first vessel are then transferred successively through the other vessels of the series, in each of which that portion of the material to be nitrated supplied thereto is caused to react with the reaction mixture from the preceding vessel. Stirring and cooling means are preferably provided for each of the vessels.

The process according to our invention may be carried out in an apparatus consisting of a number of separate vessels, or a number of compartments of a single vessel, or a combination of separate and compartmented vessels. The vessels may be of known type suitably constructed, for example of lead or steel, and cooled by the circulation of a cooling medium. The contents of each vessel may be stirred by compressed air or mechanically, as desired, and means are provided for determining the temperatures in each vessel. Outlets are also provided for drowning the charge in case of emergency. The mixture of acid and nitric ester is withdrawn continuously from the last vessel or compartment, and is then immediately separated by any suitable method.

According to the preferred embodiment of our invention, only two vessels in series are employed, and the greater part of the material to be nitrated is introduced into the first vessel. In this way, the size of the second vessel may be reduced in comparison with that of the first vessel. The time of contact between the nitric ester and the acid of decreased strength is thus reduced to a minimum, thereby bringing about an increased yield.

In order to describe our invention more clearly, we shall refer to the attached diagram representing a vertical section of the preferred embodiment of our invention. It will be understood that this is done by way of example only, and is not to be regarded as a limitation of the scope of our invention.

In the diagram and following description, the same letters refer to corresponding parts of the two vessels connected in series, the subscript (1) referring to the first or larger vessel, and the subscript (2) referring to the second or smaller vessel.

The continuous nitrators $A_1$ and $A_2$ are connected in series by the overflow pipe $B_1$ of the first, which discharges into the inner compartment $C_2$ of the second. Each vessel contains an inner compartment C, separated by a suitable wall D from the outer compartment E. The outer compartment E is provided with coils F, through which a suitable cooling medium circulates.

The greater part of the glycerin to be nitrated enters the inner compartment $C_1$ of the first vessel through the pipe $G_1$, while the remainder enters the corresponding compartment $C_2$ of the second vessel through the pipe $G_2$. The entire amount of mixed acid enters from the bottom of the first vessel through the T-valve H, which may be turned, in case of emergency, so as to discharge the contents of the vessel into the drowning tank through the pipe I.

The second vessel is also connected to the drowning tank through the pipe I, by means of the straight valve $H_2$.

In operation, the greater part of the glycerin to be nitrated is introduced continuously into the inner compartment $C_1$ of the first vessel, while the whole of the acid employed is introduced continuously through the valve H. The glycerin and the acid are mixed by means of the propeller stirrer $J_1$, which forces the reaction mixture downward through the opening $K_1$ between the inner and outer compartments $C_1$ and $E_1$ respectively. The reaction mixture then passes up between the cooling coils $F_1$ to the overflow pipe $B_1$. This mixture of nitric ester and strong mixed acid flows into the inner compartment $C_2$ of the smaller vessel, to which the remainder of the glycerin to be nitrated is continuously supplied through the pipe $G_2$. The propeller $J_2$ forces the reaction mixture downward through the space $K_2$ into the outer compartment $E_2$, whence it flows past the cooling coils $F_2$ and directly into the separator through the overflow pipe $B_2$.

The strength of the acid in the mixture flowing through the overflow pipe $B_1$ from the larger vessel is high, for example 90%, and under these conditions the nitric ester present in the first nitrator is not appreciably "dissolved" by the partially spent mixed acid. On the other hand, the acid in the reaction mixture flowing from the second vessel is well below 90% total acidity, hence the time required for the reaction mixture to pass from the overflow pipe $B_1$ through the second nitrator to the separator should be reduced to a minimum. This is readily accomplished, according to the present invention, by increasing the amount of glycerin supplied to the first vessel to such an extent that the acidity of the reaction mixture leaving that vessel is just above 88% for example. In this way only a relatively small amount of glycerin is added to the second vessel and the time required for the reaction mixture to pass from $B_1$ to $B_2$ is reduced to such an extent that the "dissolving power" of the spent acid does not materially effect the yield of nitric ester. The relative amounts of glycerin added to the two vessels will, of course, depend on the amount and composition of the mixed acid supplied to the first.

By use of a procedure similar to that described in detail for the preparation of nitroglycerin, other nitric esters may be produced continuously and in good yields. Thus, in the above example, glycerin may be replaced wholly or in part by ethylene glycol, diglycerin, or other liquid aliphatic alcohol. Again, by using a liquid aliphatic alcohol such as glycerin, glycol, and the like as a solvent, solid aliphatic alcohols and carbohydrates such as starch, sugar, levulose, pentaerythritol, and the like may be nitrated by the above procedure, to produce lower-freezing nitric ester solutions. Thus, the glycerin may contain various alcohols and other materials, the glycerin serving as a solvent therefor; and correspondingly the product may include other nitric esters as well as nitroglycerin.

Having now described our invention in detail, it is apparent that many variations can be made without departing from the spirit of the invention. We intend, therefore, to be limited only as indicated in the following patent claims.

We claim:

1. The continuous process for preparing liquid nitric esters which comprises continuously introducing at least one aliphatic alcohol into each of a series of nitrating vessels; continuously introducing a suitable nitrating acid into the first vessel of the series, and the major portion of the alcohol to be nitrated, such acid being in an amount sufficient for reaction with the whole of the material to be nitrated, transferring the reaction mixture of the first vessel successively through the other vessels in the series, and causing the reaction mixture from each preceding vessel to react further in the next following vessel with the material continuously added thereto, the time of contact of the nitric ester with the nitrating acid in any given vessel after the first being substantially less than the time of contact of the nitric ester with the nitrating acid in any preceding vessel.

2. The process according to claim 1, in which the aliphatic alcohol comprises glycerin.

3. The process according to claim 1, in which the aliphatic alcohol comprises ethylene glycol.

4. The process according to claim 1, in which the material to be nitrated comprises a solution of a carbohydrate in glycerin.

5. The continuous process for preparing nitroglycerin which comprises continuously introducing glycerin into each of two nitrating vessels, connected in series, characterized in that the greater portion of said glycerin is introduced into the first vessel, continuously introducing a suitable nitrating acid into the first vessel of the series in an amount sufficient for reaction with substantially all the glycerin to be nitrated, continuously transferring the reaction mixture of the first vessel to the second vessel and there causing it to react further with the glycerin added to said second vessel, and continuously transferring the reaction mixture from the second vessel to the separator.

6. The continuous process for preparing liquid nitric esters, which comprises continuously introducing a liquid substantially comprising at least one aliphatic alcohol into each of two nitrating vessels connected in series; continuously introducing a suitable nitrating acid into the first vessel of the series, and the major portion of the alcohol to be nitrated, such acid being in an amount sufficient for reaction with substantially all the alcohol to be nitrated; and continuously transferring the reaction mixture of the first vessel to the second vessel and there causing said reaction mixture to react further with the alcohol added to said second vessel, the time of contact of the nitric ester with the nitrating acid in said second vessel being substantially less than the time of contact of the nitric ester with the nitrating acid in the first vessel.

7. The process according to claim 6 in which the aliphatic alcohol substantially comprises glycerin.

8. The process according to claim 6 in which the aliphatic alcohol substantially comprises ethylene glycol.

9. The process according to claim 6 in which the aliphatic alcohol comprises a carbohydrate dissolved in glycerin.

10. The continuous process for preparing nitroglycerin which comprises continuously introducing glycerin into each of two nitrating vessels, connected in series, continuously introducing a suitable nitrating acid into the first vessel of the series, and the major portion of the glycerin to be nitrated, such acid being in an amount sufficient for reaction with substantially all the glycerin to be nitrated, continuously transferring the reaction mixture of the first vessel to the second vessel and there causing it to react further with the glycerin added to said second vessel, the time of contact of the nitric ester with the nitrating acid in the second vessel being substantially less than the time of contact of the nitric ester with the nitrating acid present in the first vessel, and continuously transferring the reaction mixture from the second vessel to the separator.

11. The process of preparing liquid nitric esters which comprises treating a quantity of an aliphatic alcohol with nitrating acid of a strength well above that at which the acid would have appreciable dissolving power upon the ester formed, and continuing the nitration until the strength of the acid closely approaches a strength having a substantial dissolving power on the ester formed, thereupon, and without separation of said mixture, nitrating a further quantity of alcohol with the partially spent acid in said mixture to further exhaust said acid, such further nitration being performed on a scale so far decreased in comparison with that of the first nitration that the contact of the ester with the acid, in the course of the acid's further reduction in strength, is at a minimum, whereby the time of contact of the ester with acid having a substantial dissolving power is at a minimum, and thereupon separating the ester and spent acid from each other.

FREDERICK ALEXANDER
   FERRIER CRAWFORD.
WILLIAM ARTHUR
   PERCIVAL CHALLENOR.